(12) United States Patent
Soares et al.

(10) Patent No.: US 12,607,177 B2
(45) Date of Patent: Apr. 21, 2026

(54) PISTON POSITIONING PROCESSES OF A RECIPROCATING COMPRESSOR

(71) Applicant: NIDEC GLOBAL APPLIANCE BRASIL LTDA., Joinville (BR)

(72) Inventors: Claudio Eduardo Soares, Joinville (BR); Filipe Guolo Nazário, Joinville (BR)

(73) Assignee: NIDEC GLOBAL APPLIANCE BRASIL LTDA., Joinville (BR)

( * ) Notice: Subject to any disclaimer, the term of this patent is extended or adjusted under 35 U.S.C. 154(b) by 161 days.

(21) Appl. No.: 18/253,554

(22) PCT Filed: Nov. 22, 2021

(86) PCT No.: PCT/BR2021/050510
§ 371 (c)(1),
(2) Date: May 18, 2023

(87) PCT Pub. No.: WO2022/109700
PCT Pub. Date: Jun. 2, 2022

(65) Prior Publication Data
US 2024/0026869 A1 Jan. 25, 2024

(30) Foreign Application Priority Data
Nov. 25, 2020 (BR) ...................... 10 2020 024060 9

(51) Int. Cl.
| | |
|---|---|
| *F04B 35/04* | (2006.01) |
| *H02K 11/20* | (2016.01) |
| *H02P 25/03* | (2016.01) |

(52) U.S. Cl.
CPC .............. *F04B 35/04* (2013.01); *H02K 11/20* (2016.01); *H02P 25/03* (2016.02)

(58) Field of Classification Search
None
See application file for complete search history.

(56) References Cited

U.S. PATENT DOCUMENTS

| | | | | | |
|---|---|---|---|---|---|
| 4,758,768 A | * | 7/1988 | Hendricks | .............. | H02K 29/08 |
| | | | | | 318/400.38 |
| 5,801,500 A | * | 9/1998 | Jensen | ..................... | H02P 6/21 |
| | | | | | 318/431 |

(Continued)

FOREIGN PATENT DOCUMENTS

| | | | | | |
|---|---|---|---|---|---|
| CN | 104737439 A | * | 6/2015 | ........ | H02M 7/53876 |
| KR | 20060074381 A | * | 7/2006 | | |

(Continued)

OTHER PUBLICATIONS

S. Promthong and M. Konghirun, "Sensorless control of BLDC motor drive with 150° conducting mode to minimize torque ripple," (obtained from https://ieeexplore.ieee.org/document/6713376 Feb. 5, 2025) (Year: 2013).*

(Continued)

*Primary Examiner* — Dominick L Plakkoottam
*Assistant Examiner* — Geoffrey S Lee
(74) *Attorney, Agent, or Firm* — Foley & Lardner LLP

(57) ABSTRACT

A positioning process of a piston of a reciprocating compressor is applied before the beginning of a start procedure of a BLDC motor. The reciprocating compressor includes
the BLDC motor having a rotor associated mechanically to the piston;
a frequency inverter;
a current sensor; and
a processing unit having a current controller and a command unit.
The switches are driven by the processing unit to control the currents applied to the phases of the motor.
In each new step of the process, the value of an initial current is higher or equal to the value of the initial current of a previous step; and
the value of a maximum current is higher or equal to the value of the maximum current of the previous step. The (Continued)

process includes adjusting the current at each position to avoid the return of the piston and mechanical oscillation in each new step.

11 Claims, 8 Drawing Sheets

| (56) | | | References Cited | |
| --- | --- | --- | --- | --- |

U.S. PATENT DOCUMENTS

| 5,841,252 | A | * | 11/1998 | Dunfield | H02P 6/185 |
| | | | | | 318/400.32 |
| 8,193,756 | B2 | * | 6/2012 | Jadric | F25B 49/025 |
| | | | | | 318/448 |
| 8,734,120 | B2 | * | 5/2014 | Giewont | H02P 6/22 |
| | | | | | 417/415 |
| 2006/0120898 | A1 | * | 6/2006 | Zeh | F04B 49/02 |
| | | | | | 417/415 |
| 2007/0035272 | A1 | * | 2/2007 | Hattori | H02P 6/20 |
| | | | | | 318/823 |
| 2007/0085501 | A1 | * | 4/2007 | Choi | F04B 49/02 |
| | | | | | 318/276 |
| 2007/0112301 | A1 | * | 5/2007 | Preuthun | F04B 43/04 |
| | | | | | 604/151 |
| 2009/0324427 | A1 | * | 12/2009 | Tolbert, Jr. | F04B 39/0207 |
| | | | | | 417/13 |
| 2010/0026223 | A1 | * | 2/2010 | Liu | H02P 21/32 |
| | | | | | 318/400.33 |
| 2010/0237811 | A1 | * | 9/2010 | Luckadoo | H02P 6/16 |
| | | | | | 318/400.27 |
| 2011/0193509 | A1 | * | 8/2011 | Ooyama | H02M 1/12 |
| | | | | | 363/40 |
| 2015/0345490 | A1 | * | 12/2015 | Bremeier | H02P 1/24 |
| | | | | | 417/44.11 |
| 2017/0155347 | A1 | * | 6/2017 | Park | H02P 27/08 |
| 2018/0054147 | A1 | * | 2/2018 | Frick | H02P 21/18 |
| 2018/0131305 | A1 | * | 5/2018 | Wang | H02P 21/0021 |
| 2018/0198397 | A1 | * | 7/2018 | Thomas | H02P 25/03 |
| 2023/0068845 | A1 | * | 3/2023 | Li | H02P 21/32 |
| 2024/0026869 | A1 | * | 1/2024 | Soares | H02K 11/20 |

FOREIGN PATENT DOCUMENTS

| KR | 20100058203 | A | * | 6/2010 | |
| WO | WO-2013038612 | A1 | * | 3/2013 | F04B 17/03 |
| WO | WO-2022109699 | A1 | * | 6/2022 | H02P 1/04 |

OTHER PUBLICATIONS

Machine Translation CN104737439 Perdikakis (USPTO Search) (Year: 2025).*

Machine Translation WO-2013/038612 Gotou (USPTO Search) (Year: 2025).*

Machine Translation KR-2006/0074381 Choi (USPTO Search) (Year: 2025).*

Machine Translation KR-2010/0058203 Shin (USPTO Search) (Year: 2025).*

Machine Translation WO-2022/109699 Soares (USPTO Search) (Year: 2025).*

"Adjective phrases: position" (obtained from https://dictionary. cambridge.org/us/grammar/british-grammar/adjective-phrases- position , Feb. 13, 2025) (Year: 2025).*

International Search Report dated Mar. 2, 2022 issued in International Application No. PCT/BR2021/050510, 4 pages.

Written Opinion of the International Searching Authority dated Mar. 2, 2022 issued in International Application No. PCT/BR2021/ 050510, 6 pages.

* cited by examiner (Prior art)        (Prior art)        (Prior art)

| | | Number of pairs of poles | | | | | |
|---|---|---|---|---|---|---|---|
| | | 2 pairs of poles | | 3 pairs of poles | | $N_P$ pairs of poles | |
| | | Electrical step | Mechanical step | Electrical step | Mechanical step | Electrical Step | Mechanical step |
| Driving type | Level of 120° | 60° | 30° | 60° | 20° | 60° | 60°/$N_P$ |
| | Level of 150° | 30° | 15° | 30° | 10° | 30° | 30°/$N_P$ |

PISTON POSITIONING PROCESSES OF A RECIPROCATING COMPRESSOR

CROSS-REFERENCE TO RELATED APPLICATIONS

This application is a national stage entry of PCT Application No. PCT/BR2021/050510, filed on Nov. 22, 2021, which claims priority to Brazilian Application No. 10 2020 024060 9, filed on Nov. 25, 2020, the contents of all of which are incorporated herein by reference in their entireties.

TECHNICAL FIELD

The present invention refers to reciprocal compressors comprising a brushless direct current (BLDC) triphasic synchronized motor that generates trapezoidal shaped induced voltages and a triphasic voltage inverter used for driving the BLDC motor.

More specifically, the present invention refers to piston positioning processes of a reciprocal compressor, such processes are applied before the beginning of the start procedure of the BLDC motor.

BACKGROUND OF THE INVENTION

The piston positioning process of the reciprocal compressor, before the beginning of the start procedure of the BLDC motor, is a very important step for obtaining a good start performance at the reciprocal compressors, specially under the start conditions with non-equalized pressures. In order that the piston be positioned in a suitable way, it should be moved in the reverse sense by the rotor, mechanically associated to the piston, in such a way that the piston is positioned near its top dead center. In the event the piston has not been placed in a suitable way, due, for example, to the force exerted by the cooling gas over the piston, the motor may lose its synchronism and the subsequent start procedure may fail, causing several setbacks.

To describe the problems at present faced in the prior art, FIG. 1 of the prior art depicts a diagram of a typical control system for a BLDC motor applied in a reciprocal compressor comprising a frequency inverter 200 used to drive a BLDC motor 100. Typically, the frequency inverter comprises a direct current power supply $V_{cc}$, that can be provided by an input converter stage, and switches $S_1$-$S_6$ (consisting of, for example, transistors) associated in parallel to its respective freewheel diodes $D_1$-$D_6$. As it can be noted in FIG. 1 of the prior art, the switches $S_1$-$S_6$ are associated operatively to the BLDC motor 100 and to a processing unit 300, the processing unit 300, comprising a current controller 301 and a command unit 302, is associated to a current sensor 201 located in the busbar, such current sensor 201 is used for measuring the current circulated in the BLDC motor 100 in an indirect way by means of sensing the busbar current $I_{busbar}$. The switches $S_1$-$S_6$ being shifted by means of the processing unit 300 based on the control signal, defined by the current controller 301, and in a determined commuting sequence, defined by the command unit 302, in order to control the electrical currents $I_a$, $I_b$ and $I_c$ applied, respectively, to the phases $F_A$, $F_B$ and $F_C$ of the BLDC motor 100. It is worth highlighting that the way the shifting of the switches S1-S2 is conducted depends on the type of the control technique used.

In this sense, there are several control techniques for driving the BLDC motors comprising, for example, vectorial control, direct torque control—DTC, trapezoidal control or "six steps". The "six steps" control is largely used for driving BLDC motors due to its low implementing complexity, cost of the motor/inverter set and excellent efficiency compromise.

In the "six steps" control technique, the start of the BLDC motors is typically carried out in the following way:—Step 1—a direct current is injected in the motor, making its rotor move to a known and stable position; Step 2—once the rotor is positioned in an adequate way, the inverter commutes the switches in an asynchronized way, that is, without monitoring the real positioning of the rotor. As the rotor moves, the processing unit can detect the real position of the motor and drive it in a synchronized way. In the "six steps" control technique, there are six possible combinations for shifting of the switches S1-S6 and six electrical positions, as it can be seen in FIG. 2 of the previous art, where the dark bars represent the switches $S_1$-$S_6$ being commuted, typically by 120 electrical degrees.

However, none of the above-mentioned control techniques consider the additional requirements relating to driving of a reciprocating compressor, in order that if the piston is near the compression step, when the start procedure begins, the motor will face a resistant high torque region, due to the pressure of coolant gas over the piston. As the motor does not have sufficient momentum (and consequent accumulation of kinetic energy) to defeat such resistant torque, there is a great possibility that the start fails and needs to be started again. FIG. 3 of the prior art shows a resistant torque and pressure profile that the motor must defeat in every mechanical cycle, and FIG. 4 of the prior art depicts the behavior of speed of the motor, since the start, subject to a carga such as described in FIG. 3, for the reciprocal compressors. It is noted, from FIG. 4 of the prior art, that the speed of the motor oscillates a lot, alternating moments of acceleration and deacceleration, as the compressor alternates the suction and discharge steps. It is also noted, from FIG. 4 of the prior art, that on the first turn the motor loses a lot of speed during the first compression cycle, with the speed reaching near zero, but it managed to recover after overcoming the first compression cycle and accelerates a lot when continuing.

Therefore, several documents of the prior art show piston positioning processes wherein said piston is not placed in a random way, that is, the piston is near its top dead center (also named the maximum torque point) before beginning the proper start procedure. After conducting a positioning process in such a way, when the start procedure is beginning, the motor will gain speed and inertial momentum sufficient to overcome the resistant torque, generated by the coolant gas pressure over the piston. For example, the prior art documents CN102739123, US20060120898, U.S. Pat. No. 5,801,500, KR20100058203 and US 20070085501 describe positioning processes wherein the piston reaches its top dead center before the beginning of the start procedure. It is worth highlighting that, if during the positioning process, there is no suitable control of the current that is applied to the motor, there is a risk that the torque of the motor remains lower the resistant torque, leading to the synchronism loss of the motor and, consequently, the failure of the start.

In accordance with FIGS. 5A, 5B and 5C of the prior art, the positioning processes currently used basically consist of taking the piston 500 from a first position, near the bottom dead center 501, to a final position, where the piston 500 reaches its top dead center 502. Such positioning is conducted injecting current successively in the motor, in several steps of the positioning process, in a way that the piston moves, step to step, from the first position to a final position (top dead center). As it can be seen in FIGS. 5A, 5B and 5C of the prior art, the positioning process comprises six electrical positions E1-E6 and eighteen mechanical positions M1-M18 for a motor having 3 pole pairs, that is, each electrical turn corresponds to six mechanical positions, so that the same electrical position corresponds to three mechanical positions. Naturally, the higher the number of the poles of the motor, more mechanical positions will exist in the positioning process for the same electrical position.

According to FIG. 6 of the prior art, in a first step of the positioning process, the current is injected starting from zero value and it is incremented until the maximum possible value, which results in a maximum torque in the motor, making the piston move from a first position into a second position. A certain period of stabilization is expected and then, in a second step of the positioning process, a current is injected again starting from zero value and being incremented up to the maximum possible value, making the piston move from the second position into a third position. Such steps should be conducted until the piston reaches its final position (top dead center) to remain in the position to begin the start procedure.

However, as the piston reaches the top dead center, the compressed coolant gas increases the strength exerted over said piston, generating a pressure which is opposite the positioning process. Thus, once in each step of the positioning process the current begins with zero value, the power exerted by the coolant gas can move the piston from certain previous position into the one where it was positioned and, when increasing the value of this current, the piston can be placed in an incorrect way, desynchronizing the motor, which can result in a start failure. This problem can be seen in FIG. 7 of the prior art.

In FIG. 7, and in subsequent FIGS. 9, 11 and 14, a curve is seen with the position of the piston 500 obtained from sensing a position transductor (not shown), the curve representing the displacement of the piston 500 from its bottom dead center 501 until its top dead center 502.

According to FIG. 7 of the prior art, when starting the current with zero value, the piston can return, for example, from the fourth mechanical position M4 to the sixth mechanical position M6 and be incorrectly placed on the ninth mechanical position M9 with the increment of the current. As mentioned previously, this happens because each electrical position is associated to three mechanical positions. Thus, since the nineth mechanical position M9 corresponds to the third mechanical position M3 in terms of electrical position, both related to the third electrical position E3, the control system does not manage to "notice" the difference between the mechanical positions and carries on the positioning process incorrectly in the mechanical position M9. Such incorrect positioning of the piston, resulting from the strength exerted by the coolant gas, desynchronizes the motor, which can result in a start failure.

A technique known to overcome the incorrect positioning of the piston, resulting from the strength exerted by the coolant gas, comprises injecting, in each step of the positioning process, a current always with maximum value.

Thus, when passing from a certain step into a new one, the current injected in the BLDC motor does no longer start with zero value, but with the maximum possible value, as seen in the waveform of the currents $i_a$, $i_b$ and $i_c$ of FIGS. 8 and 9 of the prior art.

Such technique overcomes the failure risks during the positioning process but adds an abrupt variation in the torque of the BLDC motor, when passing from a certain step into a new step in said process, when the piston 500 is near its top dead center 501 due to the low torque. Such abrupt variation causes an underdamped answer of the BLDC motor 100 and mechanical oscillations in the beginning of each step, as can be seen in the graph of FIG. 9, being able to generate vibrations and noises in the BLDC motor 100 as well as in the compressor.

Further, it is important to note that the torque applied on the BLDC motor 100 is in proportion to the electrical current injected in BLDC motor 100 and to the sine of the angle between the current position of the rotor 400 and the new position of the rotor 400, as shown below:

$$\tau = k \cdot i \cdot \mathrm{sen}(\delta), \text{ wherein}$$

$\tau$—mechanical torque generated in BLDC motor 100;

$i$—electric current injected in the BLDC motor 100;

$k$—project dependency constant (electrical and mechanical aspects); and $\delta$—angle between the current position of the rotor 400 and the new position of the rotor 400.

As k depends on constructing aspects, and the process according to such technique always injects the same value of current in each step, in other words, the current with maximum value, the torque developed on the BLDC motor 100 will always be the same in each step of the positioning process, independent if the piston 500 is nearer or further away from its top dead center. However, as the piston 500 leaves the first position, where it is near its bottom dead center, and approaches the final position, where it is near its top dead center, the coolant gas begins to be compressed, exerting a strength over the piston 500 which impairs the positioning process. It is important to note that the strength exerted by the coolant gas over the piston 500 reaches its maximum value when the piston 500 is near its top dead center.

Thus, it is clear that the torque value required for the BLDC motor 100 not to lose the synchronism during the positioning process is dynamic, it begins practically in zero and increases whenever the piston 500 changes the position and approaches its top dead center. As the piston 500 approaches the top dead center, the strength exerted by the coolant gas will be higher, as well as the torque and the time values required for the BLDC motor 100 to stabilize in a new position of the piston 500, as can be seen in FIG. 9.

Therefore, the prior art does not provide an ideal positioning process, which prevents the above-described problems.

Further, the prior art does not enable the adequate control of the currents with steps inferiors than 60 electrical degrees and conducting the three phases of the motor when only one current sensor in the busbar is used.

SUMMARY

The objective of the present invention consists of providing a positioning process of a piston near its top dead center that avoids the drawbacks of the prior art.

Such objective is achieved by means of a positioning process of a piston of a reciprocal compressor, applied before the beginning of the start procedure of a BLDC motor, the reciprocal compressor comprising:

the BLDC motor having a rotor mechanically associated to the piston;

a frequency inverter, used in the driving of the BLDC motor, that comprises six switches;

a current sensor positioned in the busbar;

a processing unit comprising a current controller as well as a command unit to commute the switches;

wherein switches being driven by the processing unit based on the control signal, defined by the current controller, and based on the commuting sequence, defined by the command unit, in a certain step of the positioning process, to control the electrical currents applied to the phases of the BLDC motor;

wherein:

in each new step, the value of the initial current is higher or equal to the value of the initial current of a previous step; and in each new step, the value of a maximum current is higher or equal to the value of the maximum current of the previous step.

Conveniently, the process according to the present invention consists in that the value of the initial current and the value of the maximum current depend on the position of the piston.

The process according to the present invention further consists in that the further away the piston is from its top dead center, the smaller will be the value of the initial current and the smaller will be the value of the maximum current in the new step of the positioning process.

The process according to the present invention also consists in that the stabilization time of the BLDC motor, in each step of the positioning process, is variable, being shorter in the first steps and longer in the final steps.

One of the advantages of the process according to the present invention consists in reducing the power consumption during the positioning process, optimizing the injection of the current according to the torque required, improving the final efficiency of the system.

Another advantage of the process according to the present invention consists in decreasing the heating of the motor due to several sequential starts, required when the starts are not successful in the events of loss of synchronism of the motor.

An additional advantage of the process according to the present invention consists in reducing the noise as well as the vibration during the positioning process.

The present invention also provides a positioning process of a piston of a reciprocal compressor, applied before beginning the start procedure of a BLDC motor, the reciprocal compressor comprising:

the BLDC motor having a rotor mechanically associated to the piston;

a frequency inverter, used in the driving of the BLDC motor, comprising six switches:

a current sensor positioned in the busbar;

a processing unit comprising a current controller as and a command unit to commute the switches;

wherein the switches are driven by the processing unit based on the control signal, defined by the current controller, and based on the commuting sequence, defined by the command unit, in a certain step of the positioning process, to control the electrical currents applied on the phases of the BLDC motor;

wherein:

the processing unit drives the switches in 150 electrical degrees, up to three switches can be driven concurrently in each electrical position.

Conveniently, the process according to the present invention consists in that the driving of the switches in 150 electrical degrees results on twelve driving electrical positions.

The process according to the present invention also consists in that when three of the switches are driven concurrently, the switches that have the driving superimposed by the extension of driving to 150 electrical degrees should get the same control signal.

Besides, the process according to this invention consists in that pulse width modulation is applied only on the superior switches of the frequency inverter.

An additional advantage of the process according to the present invention consists in reducing the noise as well as the vibration during the positioning process.

The present invention further provides a positioning process of a piston of a reciprocal compressor, applied before the beginning of a start procedure of a BLDC motor, which matches the previously defined processes.

Besides, the processes according to the present invention consist in the fact that the positioning process of the piston ends when the piston is near its top dead center.

Still, the process according to the present invention consists in that the piston is near its top dead center when said piston finds itself in one or two positions away from its top dead center.

Another advantage of the process according to the present invention consists in avoiding the loss of synchronism during the positioning process by keeping the torque of the motor by means of the application of an initial current adjusted according to the position of the piston at each step of the positioning process, avoiding the valleys in the torque of the motor due to the current ramp after each change of position.

BRIEF DESCRIPTION OF THE DRAWINGS

The objectives and advantages of the present invention will be clearer by means of the following detailed description of the examples and non-limiting drawings shown at the end of this document.

DETAILED DESCRIPTION

To overcome the problems of the prior art, the present application proposes three embodiments of positioning process of the piston 500 applied before the beginning of a start procedure of a BLDC motor 100.

First Embodiment

A first embodiment of the process according to the present invention proposes controlling the torque generated in the BLDC motor 100, due to the position of the piston 500, by means of a value control of the initial current in each step of the positioning process, and concurrently, by means of a value control of the maximum current in each step.

Figure 1:
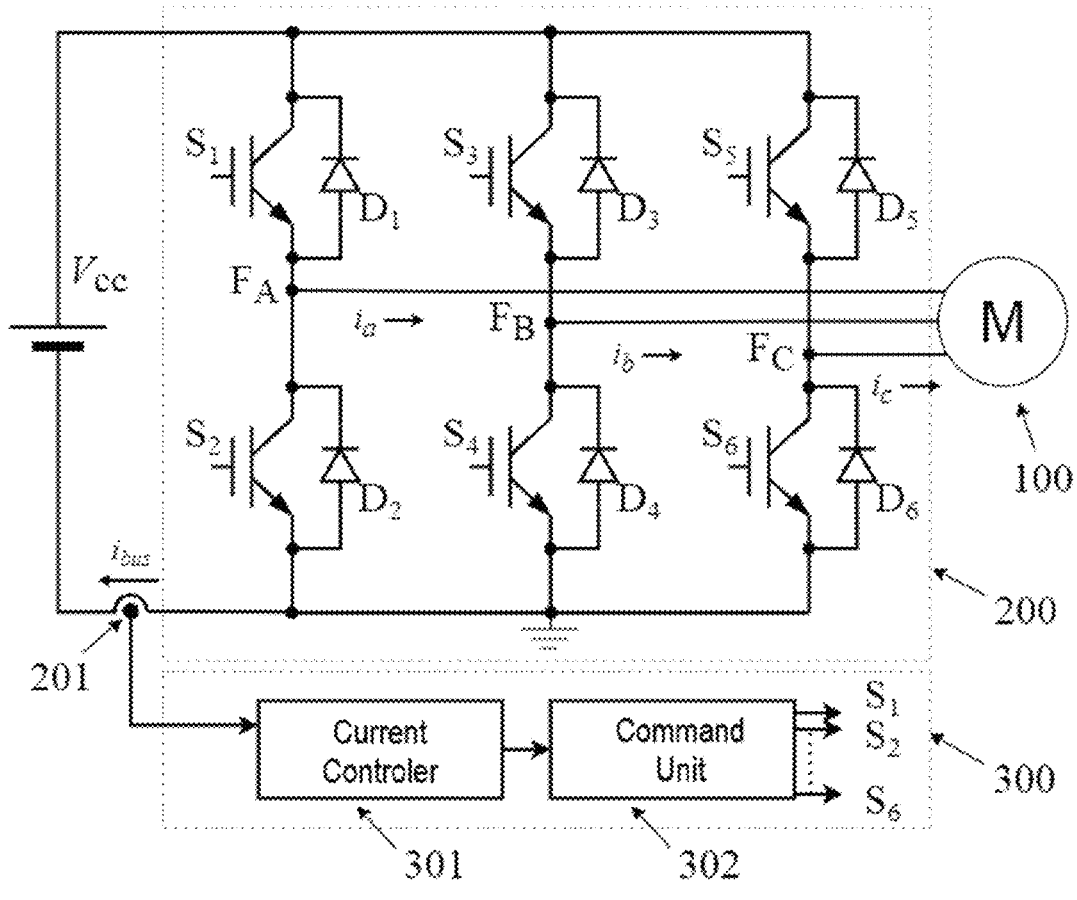
FIG. 1 depicts schematically some constructing elements of a reciprocal compressor of the prior art.
Figure 2:
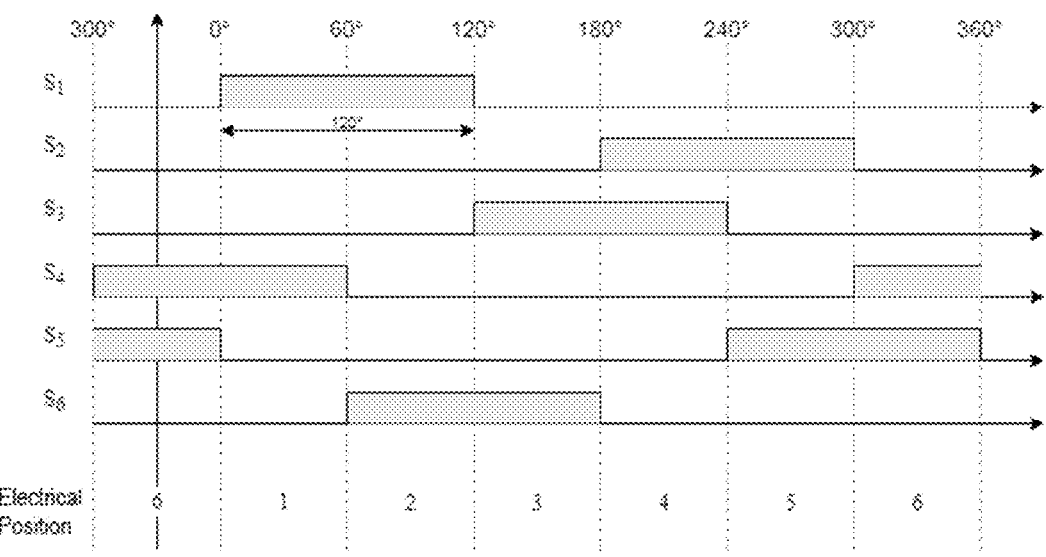
FIG. 2 depicts the commuting of the switches when using the "six-step" control technique, with level of 120 electrical degrees, of the prior art.
Figure 3:
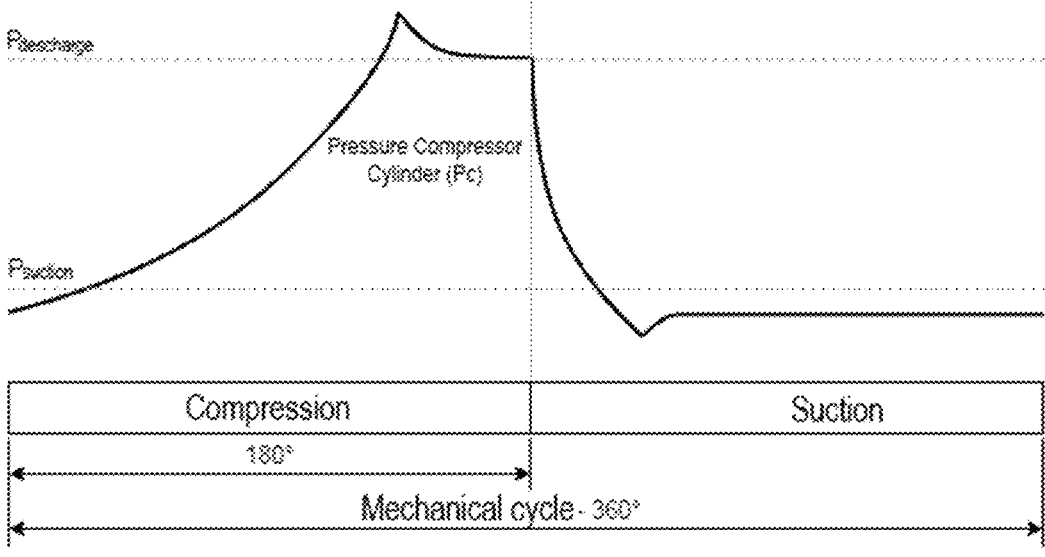
FIG. 3 depicts the resistant torque and pressure profile that the motor should defeat at each compression cycle, since the start, according to the prior art.
Figure 4:
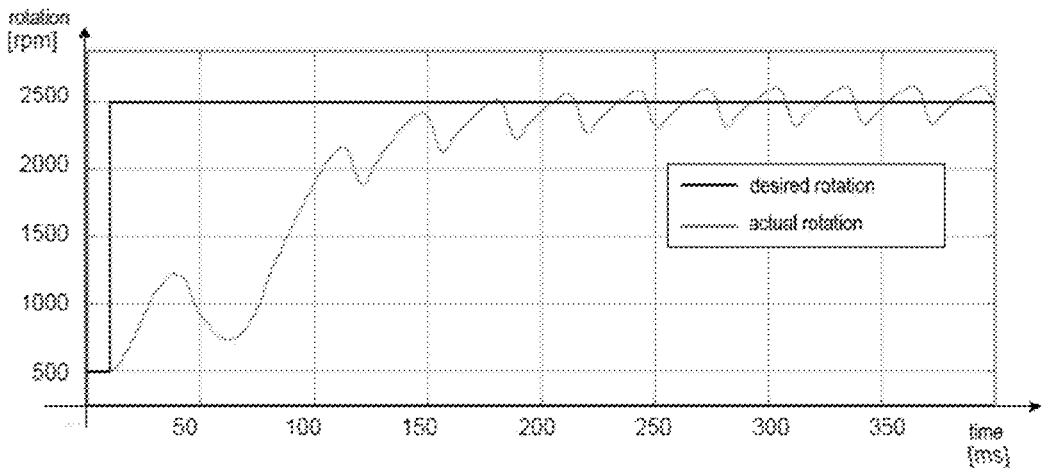
FIG. 4 depicts the behavior of speed due to the compressor torque profile, since the start, according to the prior art.
Figures 5A, 5B, 5C:
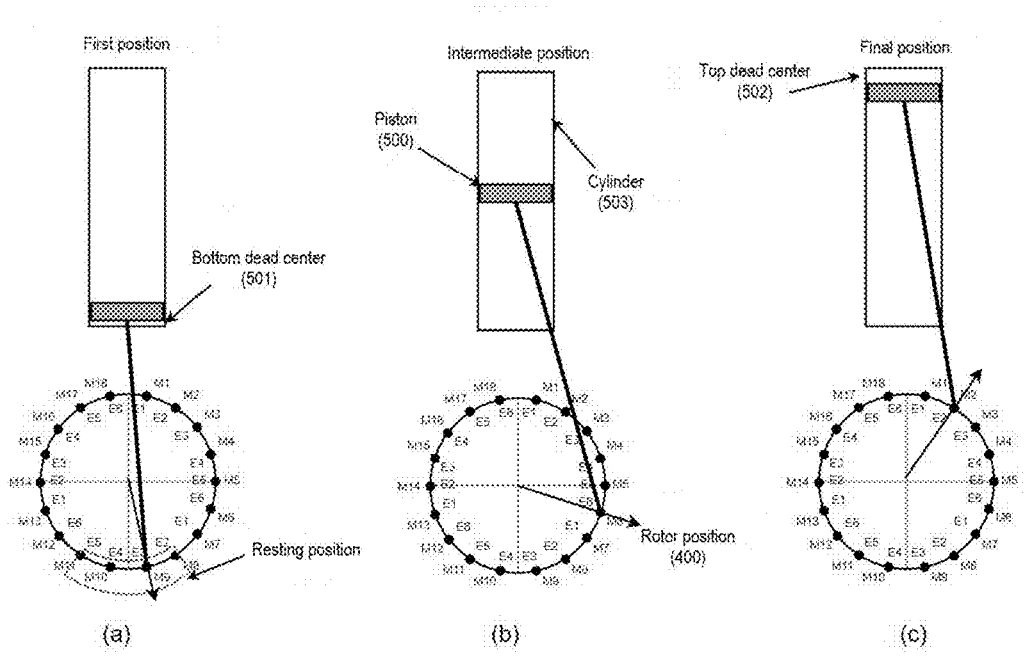
FIG. 5A depicts a possible first position of the piston.
FIG. 5B depicts a possible intermediate position of the piston.
FIG. 5C depicts a possible final position of the piston.
Figure 6:
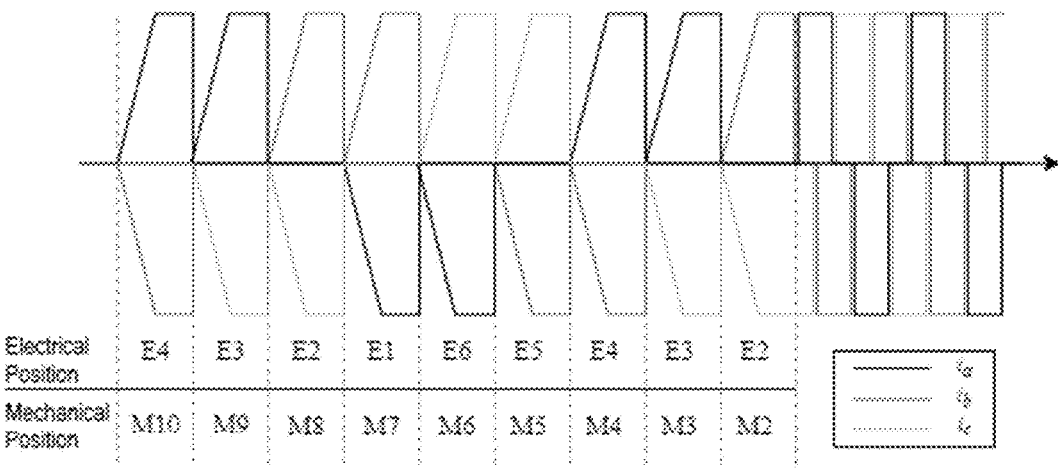
FIG. 6 depicts the current injected in a ramp profile in the phases of the motor to take the piston to the desired position, according to the prior art.
Figure 7:
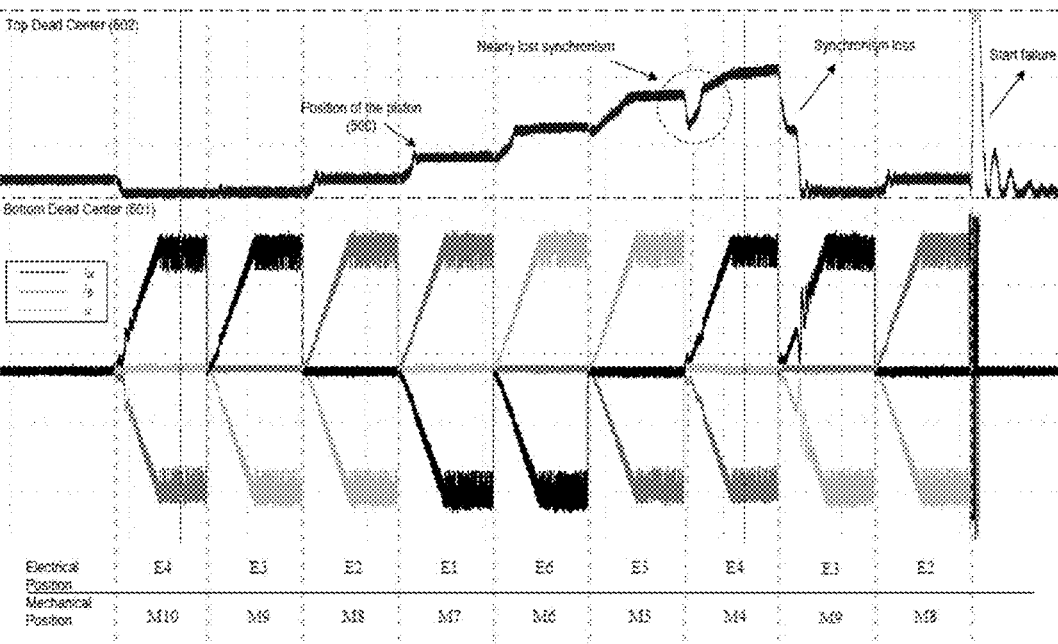
FIG. 7 depicts a practical case in the positioning process, according to the prior art, where the top curve shows the acquisition of the actual position of the piston.
Figure 8:
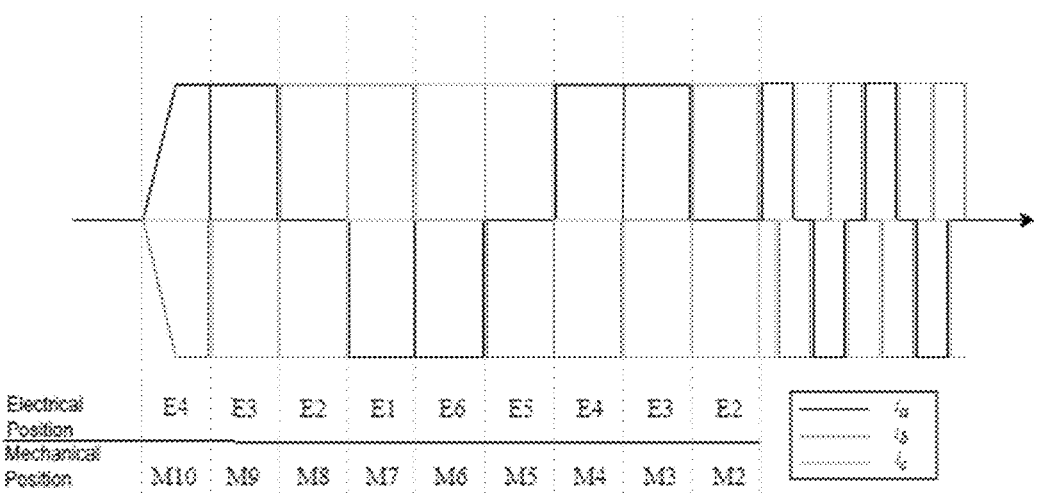
FIG. 8 depicts the injection of a current in the maximum value in each step of the positioning process according to the prior art.
Figure 9:
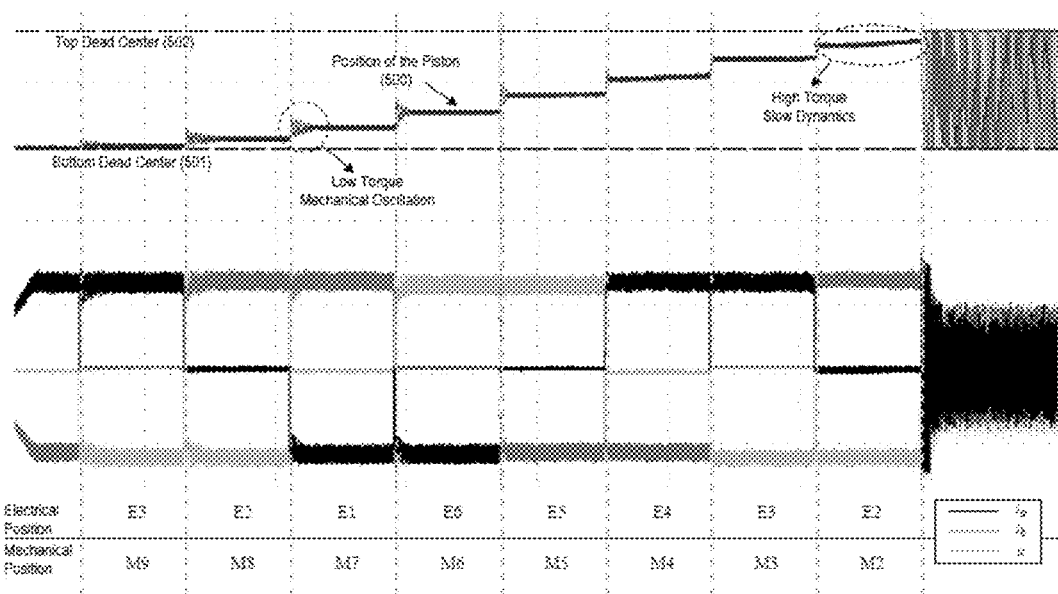
FIG. 9 depicts an application of the positioning process according to the prior art.
Figure 10:
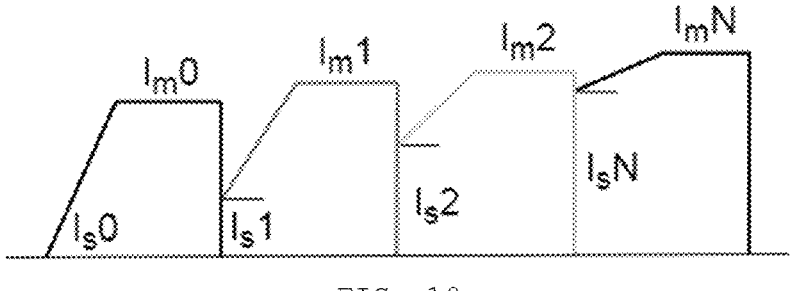
FIG. 10 depicts the first embodiment of the process according to the present invention.

FIG. 10 depicts in an exemplifying way, the second embodiment of the process according to the present invention. As it can be noted from FIG. 10, the value of the initial current Is0, Is1, Is2, . . . , IsN, in each step, is adjusted to compensate the torque increase as the piston 500 moves away of the bottom dead center 501 and approaches the top dead center 502. It is also observed in FIG. 10, that both the value of the initial current Is0, Is1, Is2, . . . , IsN and the value of the maximum current Im0, Im1, Im2, . . . , ImN, in each step, increase gradually, and thus, the value of the maximum and initial currents increases as the piston 500 approaches the top dead center 502. Thus, in the following steps of the positioning process of the first embodiment according to the present invention, the value of the initial current Is0, Is1, Is2, . . . , IsN and the value of the maximum current Im0, Im1, Im2, . . . , ImN should be greater or equal to the values of the previous steps, as shown below:

$$Is0 \leq Is1 \leq Is2 \leq \ldots \leq IsN$$

$$Im0 \leq Im1 \leq Im2 \leq \ldots \leq ImN, \text{ wherein}$$

Is—initial value of the current in each step of the positioning process;

Im—maximum value of the current in each step of the positioning process; and

N—number of steps of the positioning process.

Figure 11:
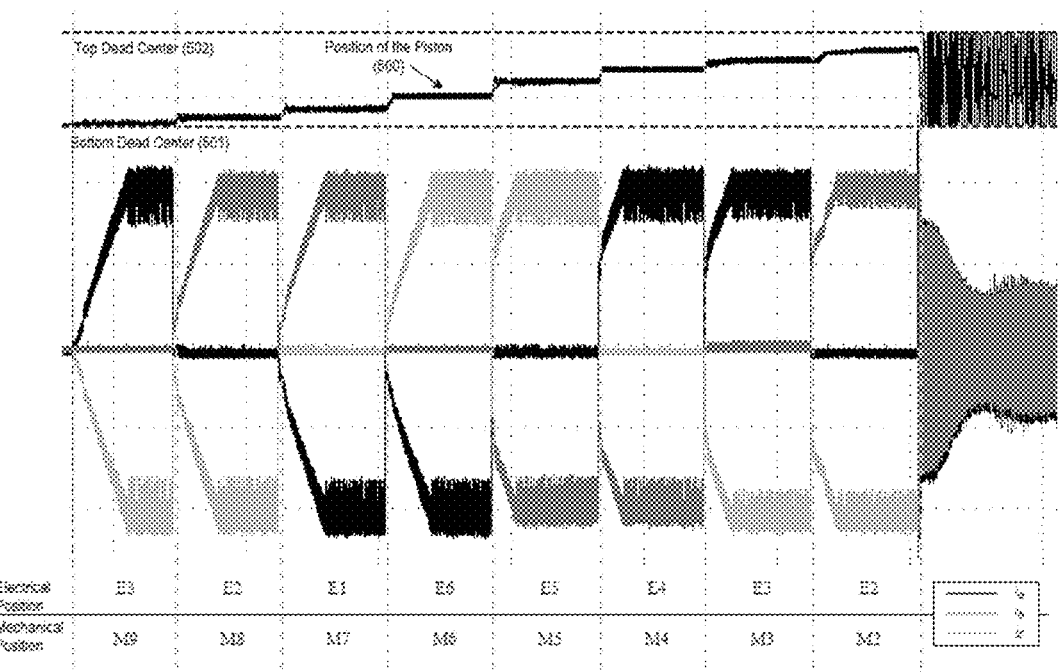
FIG. 11 depicts the application of the first embodiment of the process according to the present invention.

Thus, since the steps where the BLDC motor 100 develops a high torque are the steps where there is also a high resistant torque, there is a torque equilibrium, limiting the mechanical oscillations of the BLDC motor 100 that can generate noises and vibrations. FIG. 11 depicts an application of the second embodiment of the process according to the present invention. In this case, the initial current Is was increased at each position, but the maximum value of the current remained equal during the entire process Im.

Second Embodiment

A second embodiment of the process according to the present invention comprises reducing the size of the steps of the positioning process. Thus, with more positioning steps, the angle between the current position and the new position of the rotor 400, in each step, is smaller and, consequently, the mechanic oscillation due to a change of position is also minor.

Figures 12, 13:
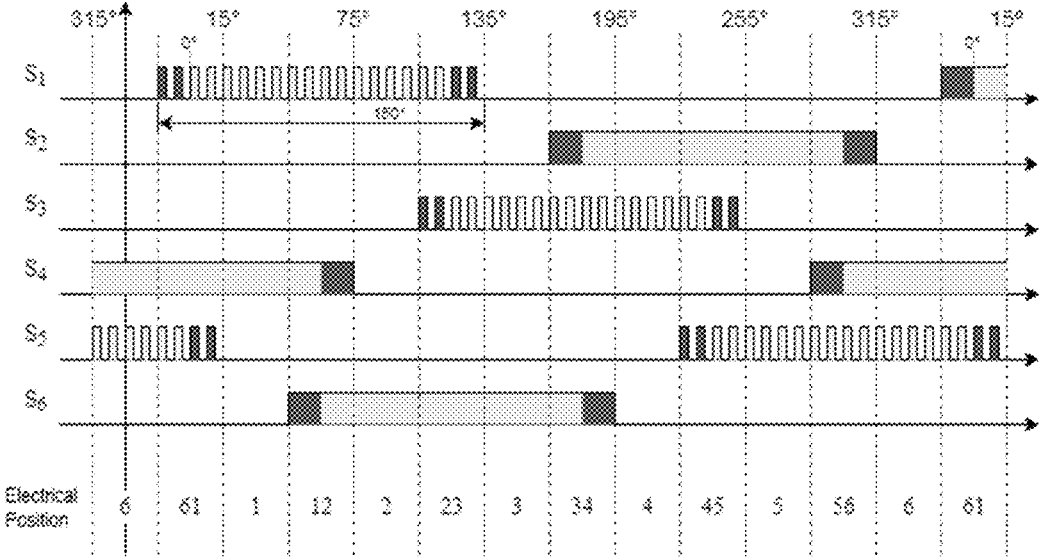
FIG. 12 depicts the second embodiment of the process according to the present invention, during the commuting of the phases of the motor with level of 150 electrical degrees.
FIG. 13 depicts, for some types of BLDC motors, the reduction in half of the angle between two positions, when using the switches in 150 electrical degrees.

In order that this is possible, the driving of the switches S1-S6 in 150 electrical degrees is conducted, as shown in FIG. 12, instead of 120 electrical degrees, as in the prior art, resulting in twelve electrical positions of driving. The new driving positions are done by superimposing the positions E1 and E2, forming a new position E12; the positions E2 and E3, forming a new position E23; the positions E3 and E4, forming a new position E34; the positions E4 and E5, forming a new position E45; the positions E5 and E6, forming a new position E56; and the positions E6 and E1 forming a new position E61.

Still according to FIG. 12, it is noticed that the driving in 150 electrical degrees is conducted in a different way, when comparing to the driving in 120 electrical degrees. As it can be noted in FIG. 12, the driving in 150 electrical degrees drives two or three switches S1-S6 concurrently, differently of the driving in 120 electrical degrees, wherein only two of the switches S1-S6 are driven in a concurrent way.

Referring to FIG. 12, in order that the current control is done in an appropriate way with only one current sensor in the busbar, when three of the switches S1-S6 are driven concurrently, the control signal applied on the switches that have the driving superimposed by the extension of the driving for 150 electrical degrees, should be similar. For example, when the switches S1, S4 and S6 are driven, in the new electrical position E12, the switches S4 and S6, which have the driving superimposed by the extension of the driving for 150 electrical degrees, receive the same control signal, being actuated in a continuous way. Alternatively, in the new position E23, the switches S1 and S3 receive the same control signal, the same pulse width modulation is applied on both switches.

Still referring to FIG. 12, the application of the pulse width modulation only on the superior switches of the frequency inverter 200, allows mitigating the boundary conditions for the project of the drivers responsible for driving the switches S1-S6, specially, of the bootstrap capacitors which compose such drivers.

FIG. 13 shows, for some types of BLDC motors 100, the reduction in half of the angle between a current position and a new position of the rotor 400. When using a minimized amplitude angle, the effects of displacement at each change of position of the BLDC motor 100 can be minimized.

Third Embodiment

Figure 14:
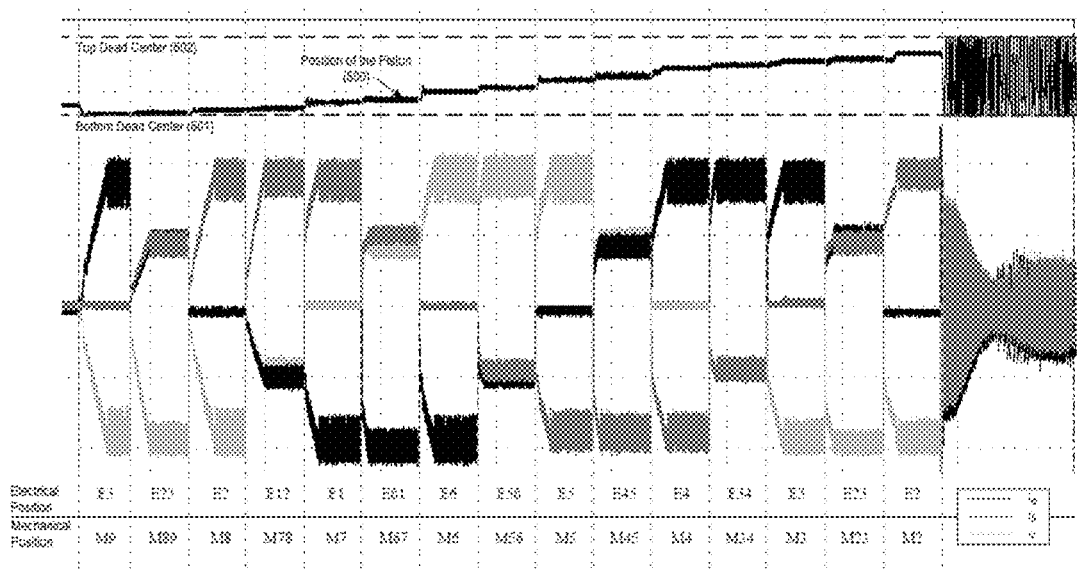
FIG. 14 depicts the third embodiment of the process according to this invention, which is the preferred embodiment of the invention.

A third and preferred embodiment of the process according to the present invention comprises combining the second and third embodiments, in other words, a commuting in 150 electrical degrees with current control at each step of the positioning process. FIG. 14 depicts, in an exemplifying way, an application of the third embodiment of the process according to this invention.

For all the above-described embodiments, the positioning process ends when the piston 500 is near its top dead center 502, in other words, at one or two positions of distance from the top dead center 502.

Besides the embodiments shown previously, the same inventive concept can be applied on other alternatives or possibilities of using the invention, for example, on air compressors.

Even though this invention has been described relating to certain preferred embodiments, it should be understood it is not intended to limit the invention to such particular embodiments. On the contrary, it is intended to embrace all the possible alternatives, modifications and equivalencies within the spirit and scope of the invention, as set forth by the annexed claims.

The invention claimed is:

1. A positioning process of a piston (500) of a reciprocating compressor, applied before the beginning of a start procedure of a brushless direct current electric motor (BLDC) motor (100), the reciprocating compressor comprising:

the BLDC motor (100) having a rotor (400) associated mechanically to the piston (500);

a frequency inverter (200), used to drive the BLDC motor (100), that comprises six switches (S1-S6);

a current sensor (201) positioned on a busbar;

one or more processors (300) configured to:

execute the positioning process comprised of a set of steps including a first step where the piston (500) is at a bottom dead center position and one or more new steps that are performed sequentially after the first step and incrementally move the piston (500) toward a top dead center position; and drive the switches ($S_1$-$S_6$) based on a six-step control signal and a commuting sequence in a determined step of the set of steps, in order to control electrical currents ($I_A$, $I_B$, $I_C$) applied to phases ($F_A$, $F_B$, $F_C$), respectively, of the BLDC motor (100);

characterized in that:

in each new step of the one or more new steps, a value of a new initial current is higher than the value of a previous initial current of a previous step; and in each new step of the one or more new steps, a value of a new maximum current is higher or equal to the value of a previous maximum current of the previous step;

characterized in that the value of the new initial current, the previous initial current, the new maximum current, and the previous maximum current depend on the position of the piston (500).

2. The positioning process, according to claim 1, characterized in that as a distance of the piston (500) from its top dead center (502) decreases, the value of the initial current and the value of the new maximum current increase at the new step of the positioning process compared to the previous step.

3. The positioning process, according to claim 1, characterized in that a time of stabilization of the BLDC motor (100), on each step of the positioning process is variable, and increases as the set of steps are executed.

4. A positioning process of a piston (500) of a reciprocating compressor, applied before the beginning of a start procedure of a brushless direct current (BLDC) motor (100), the reciprocating compressor comprising:

the BLDC motor (100) having a rotor (400) associated mechanically to the piston (500);

a frequency inverter (200), used to drive the BLDC motor (100), that comprises six switches (S1-S6);

a current sensor (201) positioned on a busbar;

one or more processors (300) configured to:

drive the motor using a six-step motor drive technique; and execute the positioning process comprised of a set of steps including a first step where piston (500) is at a bottom dead center position and one or more new steps that are performed sequentially after the first step and incrementally move the piston (500) towards a top dead center position; and drive the switches ($S_1$-$S_6$) based on a six-step control signal and a commuting sequence in a determined step of the set of steps, in order to control electrical currents ($I_A$, $I_B$, $I_C$) applied to phases ($F_A$, $F_B$, $F_C$), respectively, of the BLDC motor (100);

characterized in that:

the one or more processors (300) drives the switches (S1-S6) in 150 electrical degrees, wherein up to three switches can be actuated concurrently at each electrical position;

characterized in that:

in one or more new steps, a value of a new initial current is higher than the value of a previous initial current of a previous step; and in one or more new steps, a value of a new maximum current is higher or equal to the value of a previous maximum current of the previous step;

characterized in that the value of the new initial current, the previous initial current, the new maximum current, and the previous maximum current depend on the position of the piston (500).

5. The positioning process, according to claim 4, characterized in that the drive of the switches in 150 electrical degrees results in twelve electrical positions of actuation.

6. The positioning process, according to claim 4, characterized in that when three of the switches (S1-S6) are driven concurrently, the switches that are driven for 150 electrical degrees receive a same control signal.

7. The positioning process, according to claim 6, characterized in that pulse width modulation is applied only to switches $S_1$, $S_3$, and $S_5$ of the frequency inverter (200).

8. The positioning process of a piston (500) of a reciprocating compressor, applied before the beginning of a start procedure of a BLDC motor (100), according to claim 1, characterized in that the one or more processors (300) drives the switches (S1-S6) in 150 electrical degrees, wherein up to three switches can be actuated concurrently at each electrical position.

9. The positioning process, according to claim 1, characterized in that the positioning process of the piston (500) ends when the piston (500) is near its top dead center (502).

10. The positioning process, according to claim 9, characterized in that the piston (500) is near its top dead center (502) when said piston (500) is away from the bottom dead center position and is physically positioned away from its top dead center (502).

11. The positioning process, according to claim 4, wherein the positioning process of the piston (500) ends when the piston (500) is near its top dead center (502).

* * * * *